United States Patent
Chen et al.

(10) Patent No.: US 7,218,089 B2
(45) Date of Patent: May 15, 2007

(54) METHOD AND APPARATUS FOR IMPLEMENTING SAME PHASE POWER SUPPLY SCHEME

(75) Inventors: Tai-Jou Chen, 12F-1, 21 Kuan-Fu S. Rd., Taipei (TW) 10563; Tsai-Hsiang Chen, 1F, 10 Alley 68, Lane 41, Sec. 4, Keelung Rd., Taipei (TW) 106; Chiang-Mao Chung, 9F, 136-1 Chung-Sun Rd., San-Chung City, Taipei Hsien (TW) 241; I Chang, Taipei (TW)

(73) Assignees: Tai-Jou Chen, Taipei (TW); Tsai-Hsiang Chen, Taipei (TW); Chiang-Mao Chung, Taipei (TW)

( * ) Notice: Subject to any disclaimer, the term of this patent is extended or adjusted under 35 U.S.C. 154(b) by 131 days.

(21) Appl. No.: 10/709,995

(22) Filed: Jun. 11, 2004

(65) Prior Publication Data

US 2005/0018460 A1   Jan. 27, 2005

(51) Int. Cl.
*H01F 38/24* (2006.01)
*H02H 7/04* (2006.01)

(52) U.S. Cl. ...................................... 323/359

(58) Field of Classification Search ................ 363/148, 363/149, 152, 153; 323/355, 359, 361; 361/35, 361/36, 42, 44, 47, 62, 63, 65, 91.1, 115
See application file for complete search history.

(56) References Cited

U.S. PATENT DOCUMENTS

| | | | | | |
|---|---|---|---|---|---|
| 3,949,272 | A | * | 4/1976 | Smith | 361/48 |
| 4,188,619 | A | * | 2/1980 | Perkins | 307/3 |
| 4,473,816 | A | * | 9/1984 | Perkins | 307/3 |
| 4,611,190 | A | * | 9/1986 | Montague | 336/10 |
| 5,790,356 | A | * | 8/1998 | Bottrell et al. | 361/35 |
| 6,058,001 | A | * | 5/2000 | McComber et al. | 361/115 |
| 6,181,125 | B1 | * | 1/2001 | Li et al. | 323/361 |

\* cited by examiner

*Primary Examiner*—Matthew V. Nguyen

(57) ABSTRACT

The method and apparatus for implementing the same phase power supply scheme of the present invention is to utilize means selecting one phase from the three source lines, and supplying power only to the load at single phase line with the neutral line as a return (grounded) line, meanwhile de-energizing the loads of three phase lines at the demand side automatically during a period of time of power shortage.

5 Claims, 4 Drawing Sheets

METHOD AND APPARATUS FOR IMPLEMENTING SAME PHASE POWER SUPPLY SCHEME

BACKGROUND OF INVENTION

1. Field of the Invention

The present invention relates to a method and apparatus for implementing same phase power supply scheme, and more specifically to a method and apparatus of implementing the same phase power supply scheme to alleviate the damages incurred during the period of power shortage.

2. Description of the Related Art

In the event of the shortage of power supply, a power company usually takes two typical countermeasures, one is 'power cut-off alternately by district' and the other is 'limited power supply'. The latter will cause higher impact on the subscribers, as the duration of power outage is usually longer than the former. Therefore, in the normal power supply scheme, a power company prefers to choose the former to minimize the impact. Even so, the measure may also cause impact on all the subscribers connected on the same distribution feeder, suffering from the power outage simultaneously once the feeder is selectively cut off. This power outage will result in adverse consequences, such as staled food in the refrigerator, dead fish in the aquarium, accidental death of the patients treated at home and etc. These events will certainly degrade living quality and even jeopardize the lives of human beings.

SUMMARY OF INVENTION

The method and apparatus for implementing the same phase power supply scheme of the present invention are mainly utilized in the three-phase four-wire (3φ4W) distribution system. The present invention may also apply to the other multi-phase distribution system with neutral line.

In the normal power supply scheme with ample capacity of power supply, the distribution system will operate at the normal power supply scheme of three-phase four-wire service, however, when the capacity of power supply is insufficient, it will operate at same phase power supply scheme (also named 'revised-single-phase scheme').

The major object of the method and apparatus for implementing the same phase power supply scheme of the present invention is to utilize means selecting one phase from the source of three phase lines and supplying power only to the load at single phase line with the neutral line as a return (grounded) line, meanwhile de-energizing the loads of three phase lines at the demand side automatically. In other words, while operating at the scheme of the present invention, the power is supplied to (1) the loads connected between the single-phase line and neutral line on the secondary side of single phase transformer, and/or (2) the loads connected between the single-phase line and neutral line on the secondary side of three-phase transformer with grounded wye-grounded wye connection, whereas the loads connected on phase-to-phase and/or three-phase lines will be de-energized for either no phase-to-phase voltage appeared at the primary and/or the net voltage between three-phase lines become zero.

The power system to be operated in normal power supply scheme or 'same phase power supply scheme' will be determined by the balance of power capacity and the load demand. These two modes of scheme may be switched over in manual or automatic operation. The function may be simply performed using the changeover switch without the aids of the computer, communication and automation facilities, which are usually complicated and expensive.

When power supply is insufficient, a power company may continue to supply power based on the same phase power scheme of the present invention for certain single-phase loads while de-energize the other single-phase loads and all three-phase loads automatically. In other words, a power company may continuously supply power to certain selective subscribers in order to secure the emergency demands.

Another object of the method and apparatus for implementing the same phase power supply scheme of the present invention is to enable a power company implement a multiple fee policy for emergency and non-emergency power subscribers.

Another object of the method and apparatus for implementing the same phase power supply scheme of the present invention is to enable a power company to categorize the power consumption subscribers by groups in order to alleviate damages incurred when the power system shut down due to an instantaneous system break down or power overload.

In summary, the method for converting to same phase power supply from three phase power system of the present invention comprising:

(a) Receiving a fault or overload trip signal from main power lines;

(b) Operating an interlock of three phase circuit brakers to switch off main power lines and switch on same phase power line with a three phase to same phase conversion switch;

(c) Categorizing power consumption subscribers by emergency and non-emergency groups in a way to minimize the power shut down impact on the subscribers and differentiate the charge rates between the emergency and non-emergency subscribers;

(d) Selecting one of three phase power line as power source of the same phase power supply by means of a selection switch; and (e) Feeding power to load systems of three-phase four-wire with neutral line grounded and single-phase two-wire with one line grounded, wherein the grounded lines are connected to neutral line of the main power.

The present invention will be readily apparent upon reading the following description of a preferred exemplified embodiment of the invention and upon reference to the accompanying drawings.

DETAILED DESCRIPTION

Figure 1:
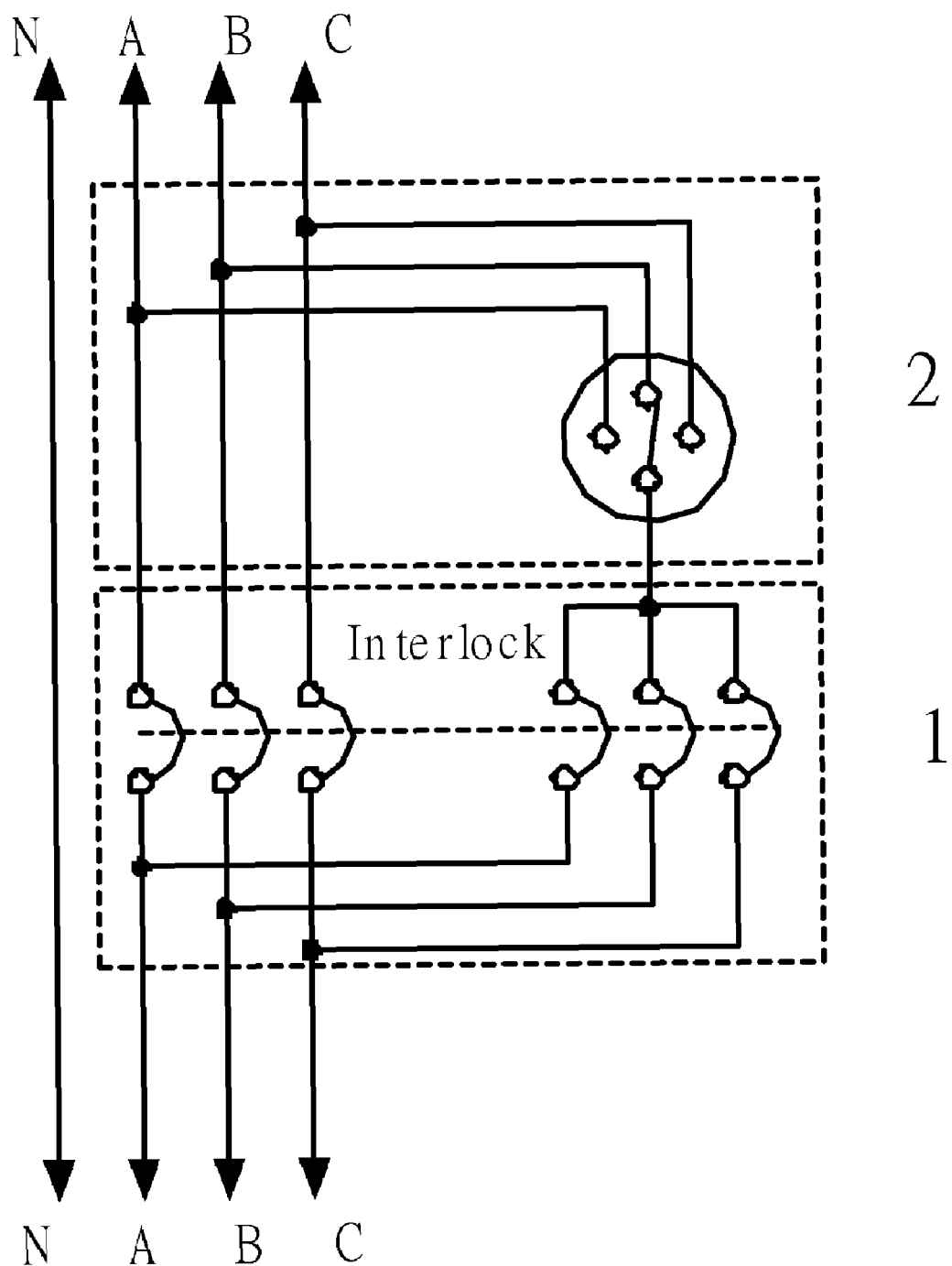
FIG. 1 illustrates a circuit arrangement in accordance with the method and apparatus for implementing same phase power supply scheme of the present invention.

In FIG. 1, a changeover switch 1 is installed on the load side of the feeder circuit breaker (FCB), where the changeover switch 1 is arranged to interlock with the feeder circuit breaker, where the other ends of the changeover switch 1 connecting to the phase selector are combined together. The phase selector 2 is an optional device to be installed when the load balancing is taken into consideration. Without the phase selector 2, the other ends of the changeover switch 1 may be directly connected to any one of phase A, phase B or phase C, whichever is the most suitable, of the power supply.

The circuit arrangement mentioned above is also applicable to other multi-phase distribution systems with a neutral or grounded wire. In general, the same phase power supply scheme of the present invention is suitable for a single-feeding end distribution feeder, such as simple radial feeder and radial feeder with tie-breaker in normal open condition. It should be noted that the interlocked tie-breaker might be closed only when the other feeder is de-energized. However, the multi-feeding ends distribution systems, such as primary network or normally closed-loop arrangements, are not suitable to implement the same phase power supply scheme of the present invention, unless a special switch is installed to avoid short-circuit when the switchover operation takes place, or the feeder is rearranged as a single-feeding end feeder.

When the system is switched over to the same phase power supply operation, the circuit arrangements of the distribution transformer windings and the loads on the transformer secondary will be described below with reference to FIG. 2.

Figure 2:
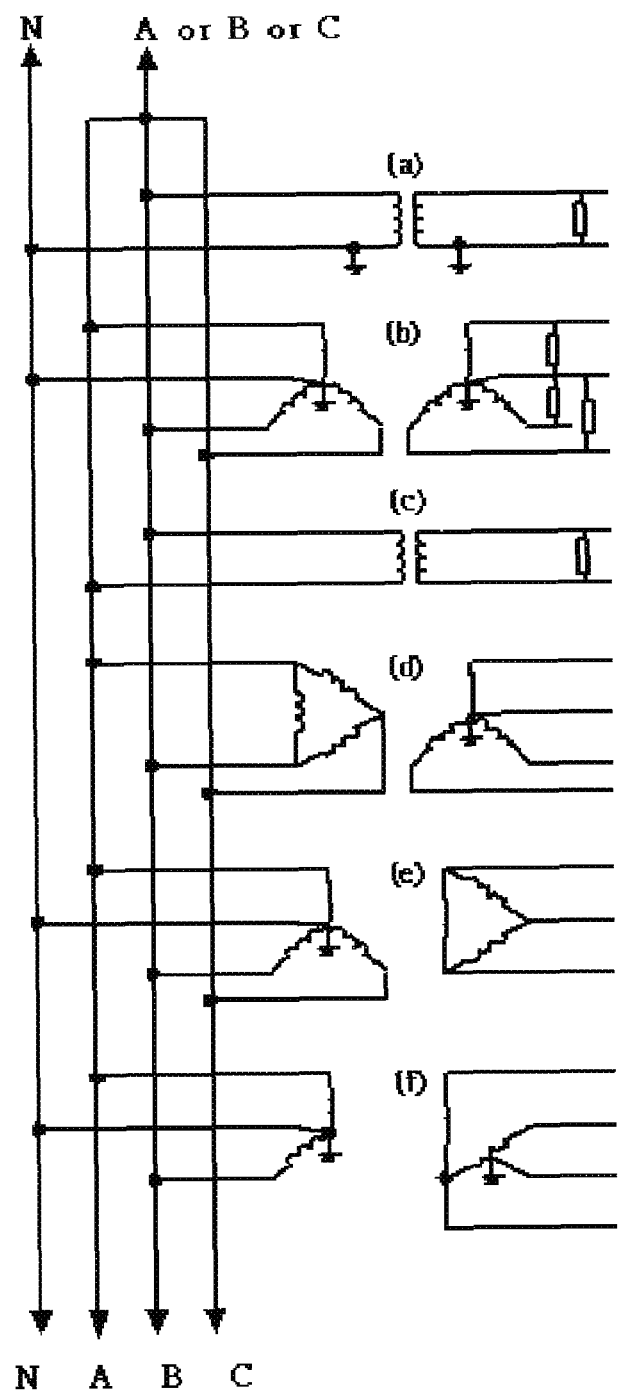
FIG. 2 illustrates various types of power distribution arrangement; each type has to fulfill the requirements set forth in same phase power supply scheme of the present invention.

In FIG. 2, with reference to type (a), the primary winding of single-phase distribution transformer is connected between any phase of the feeder lines and the neutral line, and the single-phase (phase-to-neutral) loads on the secondary side of the transformer will remain energized during the period of switchover from the normal power supply scheme to the same phase power supply scheme of the present invention.

Referring to type (b), it shows that a three-phase transformer connected in a grounded wye-grounded wye connection for a typical three-phase four-wire multi-grounded system. Only the single-phase (phase-to-neutral) loads on the secondary side of the transformer is energized, whereas the three-phase loads will be de-energized during the period of switchover from the normal power supply scheme to the same phase power supply scheme, because the three-phase voltages appeared on the secondary of the transformer are all at the same potential, in other words, there is no voltage difference between each line voltage, therefore, the three-phase lines will not output any voltage on the secondary, while individual phase voltage (phase-to-neutral) is still live. It is also noted that the transformer utilized in the present invention is consisted of three single-phase transformers. Three-phase core-type or shell-type transformer is not applicable, because its no-load excitation current might reach an unacceptable level.

Referring to type (c), it shows a primary winding of a single-phase distribution transformer connected to any two phase lines of the feeder, and because there is no voltage difference existing between any two lines, therefore, all loads on the secondary side of the transformer will be de-energized.

Referring to type (d), it shows that the primary windings of three transformers are connected in delta connection and the secondary windings can be either delta connection or Y connection. There is no voltage difference existing between any two phases on the secondary of the transformer. Hence, all single-phase and three-phase loads on the secondary side of the transformer will be de-energized. The same results will apply to the transformer with V—V, T, Y—Y or Scott connection transformers.

Referring to type (e), it shows a three-phase transformer bank with open wye-open delta connection. In this case, the three-phase loads will be in danger of burning out the transformer windings. Hence, this connection type is not allowable while implementing the same phase power supply scheme of the present invention.

Referring to type (f), it is similar to type (e) as described above, although the single-phase loads on the secondary side of the transformer may be remained energized during the period of switchover from the normal power supply scheme to the same phase power supply scheme of the present invention, however, the three-phase loads will be in danger of burning out the transformer windings. Thus, this connection type is also not allowable.

In summary, type (a) is applicable in accordance with the same phase power supply scheme of the present invention, and for type (b), all the three-phase loads will be disconnected during the period of switchover from the normal power supply scheme to the same phase power supply scheme of the present invention. Whereas types (c) and (d) are not applicable due to the absence of power supply, and type (e) and type (f) are strictly prohibited from connecting to the same phase power supply scheme of the present invention for it may burn out the transformer windings. Furthermore, the same phase power supply scheme of the present invention is more suitable for the distribution feeder with heavy phase-to-phase loading for saving power consumption during the period of power shortage.

Figure 3:
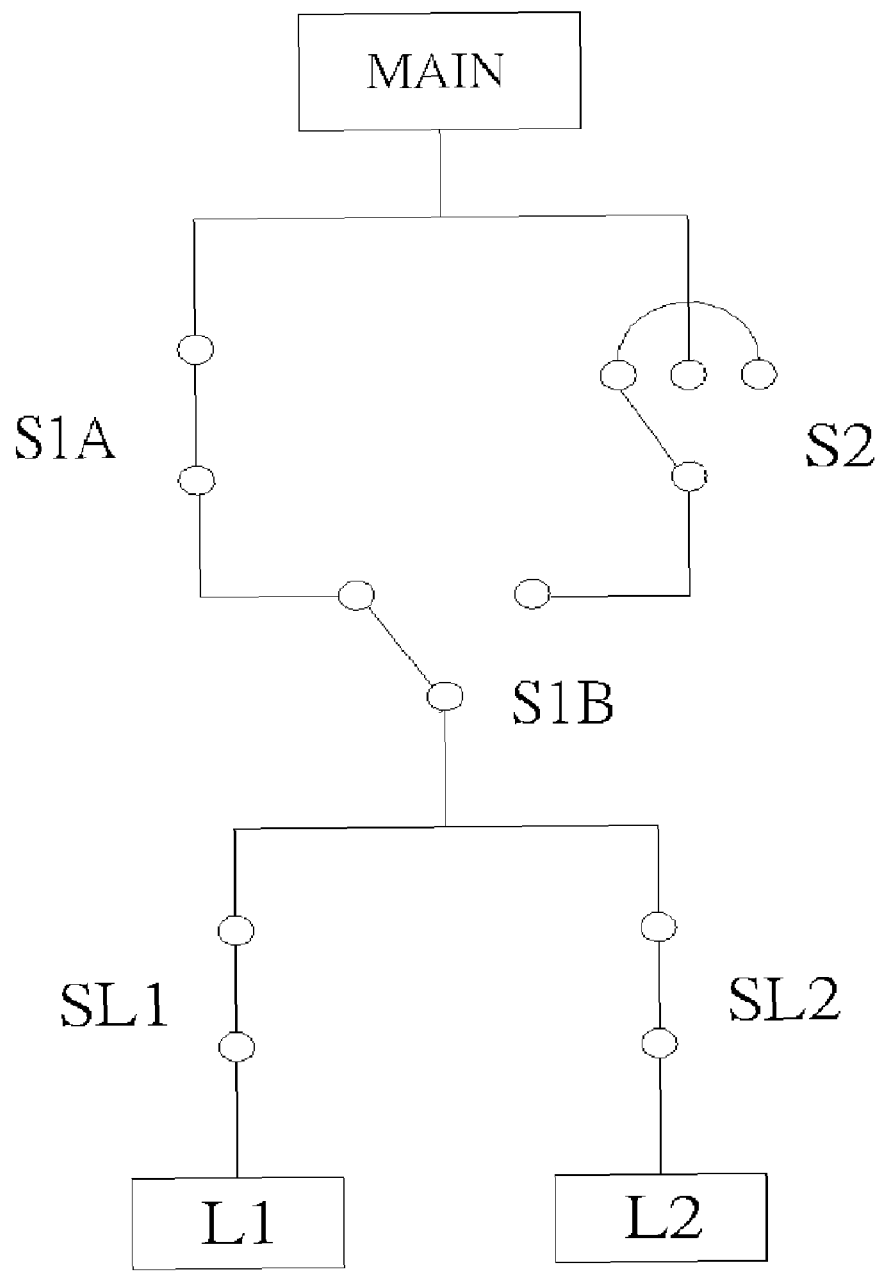
FIG. 3 illustrates functions of conversion switch, selection switch and category switch for implementing same phase power supply scheme of the present invention.

In FIG. 3, a block diagram showing the same phase power supply scheme of the present invention, indicates that when a power shortage is occurred an overload or overcurrent trip signal (not shown) will be used to switch off first switch S1A to interrupt power supply to loads, and meanwhile second switch S1B will be switched over to the other contact in order to adapt to same phase power selector S2, with which a selection of one of three phase power line as power source may be determined by power company based on load balance of power system. Before the second switch S1b was switched over to the same phase power selector S2, load selectors SL1, SL2 were operated in accordance with subscription scheme of power company to categorize emergency and non-emergency users, and controlled by use of circuit breakers.

Figure 4:
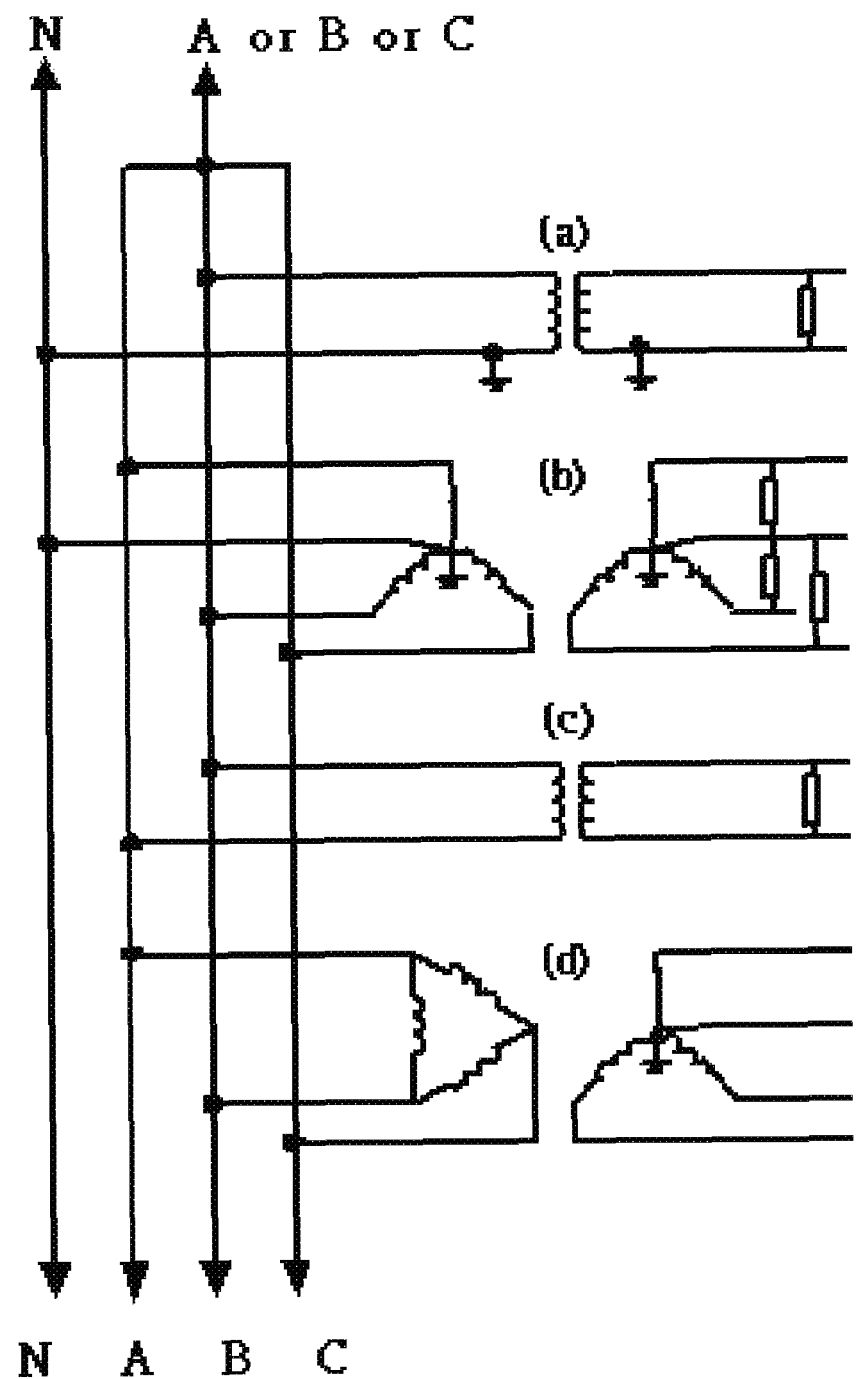
FIG. 4 illustrates one of various categories being selected during implementing same phase power supply scheme of the present invention.

In FIG. 4, it shows an example that the category of type (e) and (f) were removed from FIG. 1 by the operation of load selectors SL1, SL2.

Various additional modifications of the embodiments specifically illustrated and described herein will be apparent to those skilled in the art in light of the teachings of this invention. The invention should not be construed as limited to the specific form and examples as shown and described. The invention is set forth in the following claims.

What is claimed is:
1. A method for converting to same phase power supply from three phase power system comprising:
(a) Receiving a fault or overload trip signal from main power lines;

(b) Operating an interlock of three phase circuit breakers to switch off main power lines and switch on same phase power line with a three phase to same phase conversion switch;

(c) Categorizing power consumption subscribers by emergency and non-emergency groups in a way to minimize the power shut down impact on the subscribers and differentiate the charge rates between the emergency and non-emergency subscribers;

(d) Selecting one of three phase power line as power source of the same phase power supply by means of a selection switch; and (e) Feeding power to load systems of three-phase four-wire with neutral line grounded and single-phase two-wire with one line grounded, wherein the grounded lines are connected to neutral line of the main power.

2. A method for converting to same phase power supply from three phase power system as set forth in claim 1, wherein the conversion switch has three poles connected in short circuit at primary side and three poles kept separate at secondary side.

3. A method for converting to same phase power supply from three phase power system as set forth in claim 1, wherein the selection switch is a three to one (3-1) selection switch.

4. A method for converting to same phase power supply from three phase power system as set forth in claim 1, wherein the categories of subscribers are determined by subscription scheme of power company and controlled by use of circuit breakers.

5. A method for converting to same phase power supply from three phase power system as set forth in claim 1, wherein the selection of one of three phase power line as power source is determined by power company based on load balance of power system.

* * * * *